United States Patent
Jeong et al.

(10) Patent No.: US 10,908,949 B2
(45) Date of Patent: Feb. 2, 2021

(54) METHODS FOR PROCESSING DATA FLOW BASED SERVICE BY ALLOCATING MICRO-SERVICES THAT CORRESPOND TO ALLOCATED SERVICE IDS AND COMPUTER PROGRAMS THEREFOR

(71) Applicant: TMAXSOFT CO., LTD., Seongnam-si (KR)

(72) Inventors: Junsoo Jeong, Seongnam-si (KR); Chanpyo Hong, Cheongju-si (KR)

(73) Assignee: TMAXSOFT CO., LTD., Seongnam-si (KR)

( * ) Notice: Subject to any disclaimer, the term of this patent is extended or adjusted under 35 U.S.C. 154(b) by 241 days.

(21) Appl. No.: 16/019,468

(22) Filed: Jun. 26, 2018

(65) Prior Publication Data

US 2019/0384636 A1   Dec. 19, 2019

(30) Foreign Application Priority Data

Jun. 15, 2018  (KR) .................. 10-2018-0068635

(51) Int. Cl.
*G06F 9/46* (2006.01)
*G06F 9/48* (2006.01)
(Continued)

(52) U.S. Cl.
CPC .......... *G06F 9/4881* (2013.01); *G06F 9/3871* (2013.01); *G06F 9/466* (2013.01); *G06F 9/5005* (2013.01)

(58) Field of Classification Search
None
See application file for complete search history.

(56) References Cited

U.S. PATENT DOCUMENTS 9,635,067 B2    4/2017  Hibbard et al.
10,067,789 B2 *  9/2018  Fang .................. G06F 9/4881
(Continued)

FOREIGN PATENT DOCUMENTS

JP    2014006573 A    1/2014
JP    2017033094 A    2/2017
KR    101638136       7/2016

OTHER PUBLICATIONS

Korean Intellectual Property Office, Office Action, dated Sep. 23, 2019.
(Continued)

*Primary Examiner* — Bing Zhao
(74) *Attorney, Agent, or Firm* — Umberg Zipser LLP

(57) ABSTRACT

Disclosed is a method for controlling a database service for processing a service according to an exemplary embodiment of the present disclosure. Operations stored in a computer program for processing the method include: an operation of allocating, by a control thread, a service ID for each of one or more received services and identifying one or more micro-services included in each service; an operation of allocating, by the control thread, a micro-service for a first service among the one or more services to one worker thread among one or more worker threads; an operation of allocating, by the control thread, the micro-service of a second service to the worker thread or another worker thread regardless of whether to receive a processing result of the micro-service of the first service from the worker thread; and an operation of allocating, by the control thread, a next micro-service of the micro-service of the first service to the worker thread or another worker thread when receiving the processing result of the micro-service from the worker thread.

7 Claims, 10 Drawing Sheets

(51) Int. Cl.
    *G06F 9/50*     (2006.01)
    *G06F 9/38*     (2018.01)

(56) References Cited

U.S. PATENT DOCUMENTS

2012/0330913 A1* 12/2012 Devadhar .............. G06F 9/466
    707/703
2013/0290524 A1     10/2013 Liu et al.

OTHER PUBLICATIONS

Codingeek, codingeek.com/tutorials/nodejs/is-nodejs-single-threaded/, dated Oct. 27, 2015; downloaded Mar. 28, 2018; 8 pgs.

* cited by examiner

METHODS FOR PROCESSING DATA FLOW BASED SERVICE BY ALLOCATING MICRO-SERVICES THAT CORRESPOND TO ALLOCATED SERVICE IDS AND COMPUTER PROGRAMS THEREFOR

CROSS-REFERENCE TO RELATED APPLICATIONS

This application claims priority to and the benefit of Korean Patent Application No. 10-2018-0068635 filed in the Korean Intellectual Property Office on Jun. 15, 2018, the entire contents of which are incorporated herein by reference.

TECHNICAL FIELD

The present disclosure relates to a method for processing services created based on a data flow and to a computer program stored in a computer readable medium therefor, and more particularly, to a method for processing the services in a multi-thread architecture.

BACKGROUND ART

In order to process requests for services in a processor, all processing for the services is synchronous. The processing for the service is performed by requesting a database server for a service-related request and receiving a response to the request.

A synchronous processing method terminates one service processing completely, returns a control for the service, and then processes a next service. An asynchronous processing method returns the control to the previous service and then processes another service even if one service processing is not completed. In the synchronous processing method, when a single service to be processed is large, it takes a long time to wait for the completion, and overhead occurs, which causes a problem of performance deterioration. The asynchronous processing method has a problem that consistency is not ensured.

Thus, there is a need in the art for a service processing method that takes an advantage of the asynchronous processing method.

Korean Patent No. KR1638136 discloses a method for minimizing thread-to-thread lock contention during work distribution in a multi-thread architecture.

SUMMARY OF THE DISCLOSURE

The present disclosure has been made in an effort to provide a method for controlling a database service.

The present disclosure has been made in an effort to provide a method in which micro-services in a service are processed while maintaining consistency in a multi-thread architecture through a database service control method.

An exemplary embodiment of the present disclosure provides a computer program stored in a computer-readable storage medium, and disclosed are computer program operations that execute the following operations for processing a service when the computer program when the computer program is executed by one or more processors of a computing device. The computer program may include an operation of allocating, by a control thread, a service ID for each of one or more received services and identifying one or more micro-services included in each service; an operation of allocating, by the control thread, a micro-service for a first service among the one or more services to one worker thread among one or more worker threads; an operation of allocating, by the control thread, the micro-service of a second service to the worker thread or another worker thread regardless of whether to receive a processing result of the micro-service of the first service from the worker thread; and an operation of allocating, by the control thread, a next micro-service of the micro-service of the first service to the worker thread or another worker thread when receiving the processing result of the micro-service from the worker thread.

In an alternative exemplary embodiment of the operations of the computer program that executes the following operations for processing a service, the operation of allocating a service ID for each of one or more services receiving a control thread and identifying one or more micro-services included in each service may include an operation of assigning, by the control thread, a first service ID for identifying a service to the first service, and an operation of assigning, by the control thread, a second service ID different from the first service ID to the second service different from the first service.

In an alternative exemplary embodiment of the operations of the computer program that executes the following operations for processing a service, the operation of allocating, by the control thread, a micro-service for a first service among the one or more services to one worker thread among one or more worker threads may include an operation of allocating, by the control thread, a first micro-service among one or more micro-services of the first service to the worker thread.

In an alternative exemplary embodiment of the operations of the computer program that executes the following operations for processing a service, the service ID for identifying the service may be assigned to the micro-service and the same service ID may be assigned to one or more micro-services belonging to the same service.

In an alternative exemplary embodiment of the operations of the computer program that executes the following operations for processing a service, the operation of allocating, by the control thread, a next micro-service of the micro-service of the first service to the worker thread or another worker thread when receiving the processing result of the micro-service from the worker thread may include an operation of identifying, by the control thread, the first service including the micro-service based on the first service ID of a processing result of the received micro-service, and an operation of allocating, by the control thread, a next micro-service among the micro-services of the first service to the worker thread or another worker thread.

In an alternative exemplary embodiment of the operations of the computer program that executes the following operations for processing a service, the operations may further include an operation of deciding, by the control thread, to roll back the micro-service included in one or more first services executed when receiving a processing failure result of the next micro service of the first service from the worker thread.

In an alternative exemplary embodiment of the operations of the computer program that executes the following operations for processing a service, the operation of deciding, by the control thread to roll back the micro-service included in one or more first services executed when receiving a processing failure result of the next micro service of the first service from the worker thread may include an operation of identifying, by the control thread, the first service to be rolled back based on the first service ID of the processing failure result of the received micro-service, and an operation of performing, by the control thread, a rollback to roll back a processing result of the executed micro-service of the first service to the processing result before execution.

Another exemplary embodiment of the present disclosure provides a computing device for processing a service. The computing device for processing a service may include: a memory and the processor may allow a control thread to allocate a service ID for each of one or more received services and identify one or more micro-services included in each service, the control thread to allocate a micro-service for a first service among the one or more services to one worker thread among one or more worker threads, the control thread to allocate the micro-service of a second service to the worker thread or another worker thread regardless of whether to receive a processing result of the micro-service of the first service from the worker thread, and the control thread to allocate a next micro-service of the micro-service of the first service to the worker thread or another worker thread when receiving the processing result of the micro-service from the worker thread.

According to exemplary embodiments of the present disclosure, a method for controlling a database service for processing a service can be provided.

According to exemplary embodiments of the present disclosure, a method can be provided in which micro-services in a service are processed while maintaining consistency in a multi-thread architecture through a database service control method.

DETAILED DESCRIPTION

Figure 1:
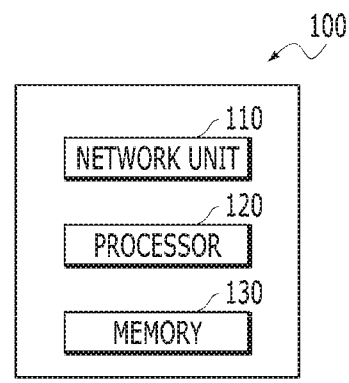
FIG. 1 is a block diagram of a computing device that performs a method for controlling a database service for processing a service according to an exemplary embodiment of the present disclosure.

Various exemplary embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to all of the case where X uses A, the case where X uses B, and the case where X uses both A and B. Further, it should be understood that the term "and/or" used in the specification designates and includes all available combinations of one or more items among enumerated related items.

It should be appreciated that the term "comprises" and/or "comprising" means that presence or inclusion of corresponding features and/or components. However, it should be appreciated that the term "comprises" and/or "comprising" means that presence or inclusion of one or more other features, components, and/or a group thereof is not excluded. Further, when not separately specified or not clear in terms of the context that a singular form is indicated, it should be construed that the singular form generally means "one or more" in the present specification and the claims.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. General principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present specification, a service may be used interchangeably with a service request. A service according to the present disclosure is defined as a set of micro-services configured according to the flow of data. Processing of the service may be performed in a control thread according to the type of service. Processing of the service may be performed in a worker thread according to the type of service. How to bind transactions may be decided while all services are performed according to database work performed in a micro-service. How to apply the transactions may be decided while all services are performed according to the database work performed in the micro-service.

FIG. 1 is a block diagram of a computing device that performs a method for controlling a database service for processing a service according to an exemplary embodiment of the present disclosure. A configuration of the computing device 100 illustrated in FIG. 1 is only an example shown through simplification. In an exemplary embodiment of the present disclosure, the computing device 100 may include other components for performing a computing environment of the computing device 100. The computing device 100 may be a terminal or server. The computing device 100 may be all arbitrary types of devices. The computing device 100 as a digital device may be a digital device with a calculation capability, which has a processor installed therein and a memory, such as a laptop computer, a notebook computer, a desktop computer, a web pad, or a mobile phone. The computing device 100 may be a web server processing a service.

The computing device 100 may include a network unit 110, a processor 120, and a memory 130.

The network unit 110 may include a transmission unit and a reception unit. The network unit 110 may include a wired/wireless Internet module for network access. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, a digital subscriber line (XDSL), fibers to the home (FTTH), power line communication (PLC), or the like may be used.

The network unit 110 may be positioned at a comparatively short distance from the service processing apparatus including a short range communication module and transmit and receive data to and from an electronic apparatus including the short range communication module. As short-range communication technology, Bluetooth, radio frequency identification (RFID), infrared data association (IrDA), ultra wideband (UWB), ZigBee, or the like may be used. In an exemplary embodiment of the present disclosure, the network unit 110 may sense a connection state of the network and transmission and reception speeds of the network. Data received through the network unit 110 may be stored through the memory 130 or transmitted to other electronic apparatuses positioned in a short range through the short-range communication module.

The network unit 110 may receive a request for the service from an external computing device. The network unit 110 may receive the request for the service from the external computing device and transfer the request to the processor. The processor 120 receiving the service request may cause a control thread to process the service asynchronously. The network unit 110 may transmit and receive data for performing the method of controlling a database service for processing a service according to an exemplary embodiment of the present disclosure to and from other computing devices, servers, and the like. In addition, the network unit 110 may enable communication among a plurality of computing devices so that service processing is distributively performed in each of the plurality of computing devices.

The processor 120 may be constituted by one or more cores and may include processors for data analysis and service processing, which include a thread, a central processing unit (CPU) of the computing device, a general purpose graphics processing unit (GPGPU), a tensor processing unit (TPU), and the like. The processor 120 may read a computer program stored in the memory 130 to perform the service processing method according to an exemplary embodiment of the present disclosure. Further, the computer program executed in the computing device according to an exemplary embodiment of the present disclosure may be a CPU, GPGPU, or TPU executable program. The service may mean one operation to be processed by the processor. A micro-service may be a configuration including some of steps for processing the service. The service may include one or more micro-services. The processing of the service may be completed when the processing of one or more micro-services is completed. The thread may be one work unit in the processing of the service. The thread may be a unit of a flow executed in a process. The thread may contain information needed to perform the processing for the service. The control thread may be a thread that controls operations for the service and allocates work to worker threads. The control thread may receive the service request. The worker thread may be a thread that is assigned service work and performs the processing for the service. A transaction manager may be executed in a thread that receives a rollback or commit request of the micro-services from the control thread or worker thread and performs a rollback or commit. The method according to an exemplary embodiment of the present disclosure may be performed by the processor.

In an exemplary embodiment of the present disclosure, the computing device 100 may distribute and process the service processing by using at least one of the CPU, the GPGPU, and the TPU. Further, in an exemplary embodiment of the present disclosure, the computing device 100 may distribute and process the service processing together with other computing devices.

The processor 120 may read the computer program stored in the memory 130 to perform the service processing method according to an exemplary embodiment of the present disclosure. A multi-thread architecture for performing the service processing method according to an exemplary embodiment of the present disclosure may be constituted by one or more control threads and one or more worker threads. In the case of service processing through a blocking-I/O method in the related art, network time overhead is added, which may cause performance problems. In the asynchronous processing method according to an exemplary embodiment of the present disclosure, the service may be processed through a non-blocking I/O method. A synchronous processing method is to terminate one service processing completely, return a control for the service, and process a next service. An asynchronous processing method according to an exemplary embodiment of the present disclosure is to return the control to the previous service and process another service even if one service processing is not completed.

When the control thread of the processor 120 receives the service, the control thread may allocate a service ID to the received service. The service ID may include information for identifying the service. The control thread of the processor 120 may identify the service based on the service ID. The processor 120 may receive a plurality of services and assign the service ID to each service of the plurality of received services. The processor 120 may assign a first service ID to a first service to identify the first service. The processor 120 may assign a second service ID to a second service to identify the second service different from the first service. The service may include tasks that a client of the computing device 100 wishes to process using the computing device 100. For example, the service may be an account transfer task for customer A, which the client (that is, a banker terminal, etc.) of the computing device 100, which constitutes the server of a bank, wishes to process using the computing device 100. For example, other services may be the account transfer task, an account inquiry task, etc. for customer B, which the client (that is, the banker terminal, etc.) of the computing device 100, which constitutes the server of the bank, wishes to process using the computing device 100. The disclosure of the service described above is just an example and the present disclosure is not limited thereto.

The control thread of the processor 120 may identify one or more micro-services included in the service. The micro-service may be configured as an intermediate step for performing the service. That is, when the service is the task, the micro-service may include operations that need to be performed to process the service. For example, when the service is the account transfer task for customer B of customer A, the micro-service may be configured as a withdrawal operation from a customer A account and a deposit operation to a customer B account. The disclosure of the micro-service described above is just an example and the present disclosure is not limited thereto. The service ID may be assigned to each of one or more micro-services included in the service and the micro-services belonging to the same service may have the same service ID.

The control thread of the processor 120 may determine how to bind the transaction according to database work performed in the micro-service while the entire service is being performed. The control thread of the processor 120 may determine how to apply the transaction according to the database work performed in the micro-service while the entire service is being performed.

When the control thread of the processor 120 receives the service, the control thread of the processor 120 may identify one or more micro-services included in the received service. The service may include a micro-service for an execution operation of the service and a micro-service for recording whether the execution operation of the service is successful. The micro-service for the execution operation of the service included in one service and the micro-service for recording whether the execution operation of the service is successful may have different service IDs. A plurality of micro-services included in one service may be allocated a plurality of service IDs. For example, when the service is the account transfer task for customer D of customer C, the micro-services may be constituted by a withdrawal operation from a customer C account, a deposit operation in a customer D account, an operation of storing information regarding whether withdrawal from the customer C account is successful in a database, and an operation of storing information regarding whether deposit in the customer D account is successful in the database. Each of the micro-services of the withdrawal operation from the customer C account and the deposit operation in the customer D account may be assigned the first service ID. Each of the micro-services of the operation of storing the information regarding whether the withdrawal from the customer C account is successful in the database and the operation of storing the information regarding whether the deposit in the customer D account is successful in the database may be assigned the second service ID in order to distinguish the micro-services from the micro-services assigned the second service ID. One or more micro-services bundled with the first service ID and one or more micro-services bundled with the second service ID may be processed in one or more databases.

Some micro-services of the plurality of micro services included in one service may call another service. One or more micro services that call another service may be processed by being assigned the service ID which is the same as the called service.

The control thread of the processor 120 may allocate the micro-service included in the service to the worker thread. A plurality of worker threads may be provided. The control thread of the processor 120 may allocate the processing of the micro-service to a non-working worker thread among the plurality of the worker threads. The worker thread may process the allocated micro-services and return the results to the control thread.

The control thread of the processor 120 may allocate the micro-services included in another service to the worker thread, regardless of whether to receive a processing result for the micro-service included in the service from the worker thread. Since there is no need to wait for processing completion between different services for consistency, the control thread of the processor 120 may allocate the micro-service of the second service to the worker thread, regardless of a processing state of the micro-service of the first service. In this case, the worker thread to which the micro-service of the second service is allocated may be the same as the worker thread to which the micro-service of the first service is allocated (i.e., the worker thread completes the work for the micro-service of the first service and is waiting) or different from (i.e., when the worker thread is performing the work for the micro-service of the first service, etc.). As described above, since the control thread of the processor 120 may perform asynchronously parallel processing of the micro services included in the different services without waiting for completion of the mutual processing, overhead of waiting for completion of the service processing may be eliminated, thereby enhancing processing performance of the computing device. For example, when the first service is the account transfer task for customer B of customer A and the second service is a loan approval task for customer C, there may be no need for consistency for the first service and the second service. In this case, the control thread of the processor 120 may allocate the second service to the worker thread in units of micro-services so that the second service may be processed by the worker thread even when the micro-service of the first service is being processed by the worker thread (i.e., when a withdrawal micro-service for A is being processed by the worker thread, etc.). The disclosure of the service described above is just an example and the present disclosure is not limited thereto. When the control thread of the processor 120 receives the processing result of the micro-service from the worker thread, the control thread of the processor 120 may allocate the next micro-services included in the same service to the worker thread. When the control thread of the processor 120 receives a processing completion result of the micro-service from the worker thread so that the micro-services included in the same service maintain the consistency, the control thread of the processor 120 may allocate the next micro-service to the worker thread. Through the synchronous processing of the micro-services included in the same service, multi-threading processing in one service may maintain the consistency. When the control thread of the processor 120 receives the processing result of the micro-service from the worker thread, the control thread of the processor 120 may identify the service including the corresponding micro-service from the service ID of the processing result and allocate the next micro-service of the identified service to the worker thread. In this case, the worker thread to which the next micro-service is allocated may be the same worker thread as the worker thread that processes the previous micro-service or may be a different worker thread. For example, if the first service is the account transfer task for customer B of customer A, only when the withdrawal operation (first micro-service) from the account of customer A is performed and thereafter, the deposit operation (second micro-service) in the account of customer B is performed, the consistency may be maintained. In this case, the worker thread of the processor 120 may allocate the first micro-service to the worker thread and receive the processing result from the worker thread and then, identify the service based on the service ID when the processing result is completed and allocate the second micro-service, which is the next micro-service of the identified service, to the worker thread. The disclosure of the service and the micro-service described above is just an example and the present disclosure is not limited thereto.

When the control thread of the processor 120 receives a processing failure result of the micro-service from the worker thread, the control thread of the processor 120 may decide to roll back an already executed micro-service of the service including the corresponding micro-service. When the control thread of the processor 120 receives that the processing result of the micro-service is a failure from the worker thread, the control thread of the processor 120 may identify the service to be rolled back based on the service ID of the processing result. The control thread of the processor 120 may roll back the micro-service. The control thread of the processor 120 may transfer the rollback of the micro-service to a separate transaction manager. The transaction manager may perform the rollback of the micro-service transferred from the control thread of the processor 120. The worker thread of the processor 120 that fails to process the micro-service may transfer the rollback of the micro service of which processing is unsuccessful to the separate transaction manager. The transaction manager may perform the rollback of the micro-service transferred from the worker thread of the processor 120. For example, if the first service is the account transfer task for customer B of customer A, only when both the withdrawal operation (first micro-service) from the account of customer A and the deposit operation (second micro-service) in the account of customer B need to be processed, it may be determined that the first service is completed. However, when the processing of the first micro-service is completed, but the processing of the second micro-service is unsuccessful (for example, when an account number of customer B is not valid, the deposit and the withdrawal of the account of customer B is suspended), a problem may occur in consistency at the time of terminating the processing of the service in a current state. Therefore, when the control thread of the processor 120 receives the processing failure result of the second micro-service from the worker thread, the control thread of the processor 120 may decide to roll back the service including the second micro-service.

The control thread of the processor 120 may identify the service ID of the second micro-service from the processing failure of the second micro-service and identify the service including the second micro-service based on the service ID. The control thread of the processor 120 may decide the rollback to roll back the processing result of the micro-service (in this example, the first micro-service) which is already processed among the micro-services included in the micro-service included in the identified service to the processing result before the execution. The control thread of the processor 120 may perform the rollback (cancellation of the withdrawal from the account of customer A in this example) to roll back the processing result of the micro-service to the processing result before the execution of the corresponding operation. The control thread of the processor 120 may transfer to the separate transaction manager the rollback (cancellation of the withdrawal from the account of customer A in this example) to roll back the processing result of the micro-service to the processing result before the execution. The transaction manager may perform the rollback (cancellation of the withdrawal from the account of customer A in this example) transferred from the control thread of the processor 120. The worker thread which fail to process the deposit operation (second micro-service) in customer B account may transfer to the separate transaction manager the rollback (cancellation of the withdrawal from the account of customer A in this example) in order to roll back the processing result to the processing result before the execution of the corresponding operation. The transaction manager may perform the rollback transferred from the worker thread of the processor 120. The disclosure of the service and the micro-service described above is just an example and the present disclosure is not limited thereto. As described above, when the execution of the service is not finally successful, all of the micro-services included in the service are rolled back, so that the consistency may be maintained even when the execution of the service is unsuccessful. The memory 130 may store a computer program for executing the method for controlling a database service for processing a service according to an exemplary embodiment of the present disclosure. The program stored in the memory may be read and driven by the processor 120. Data regarding the control thread and the worker thread may be stored in the memory. The memory may store a service ID matching the service, and the like.

The control thread of the processor 120 may process the rollback or commit of the micro-services. The control thread of processor 120 calls the separate transaction manager to process the rollback or commit of micro-services to transfer information on the rollback or commit. The transaction manager of the processor 120 may perform the rollback or commit of the transferred micro-services.

Using a method for processing data flow based services of an embodiment of the present disclosure, a computing device may process a plurality of services asynchronously. By processing a plurality of services asynchronously in a multi-thread architecture, it is possible to shorten processing time and maintain consistency when the computing device processes the plurality of services, thereby improving the capabilities of the computing device to process a plurality of services in the multi-thread architecture, and the operating speed of the computing device can be improved.

Hereinafter, various exemplary embodiments of the present disclosure will be described.

Figure 2:
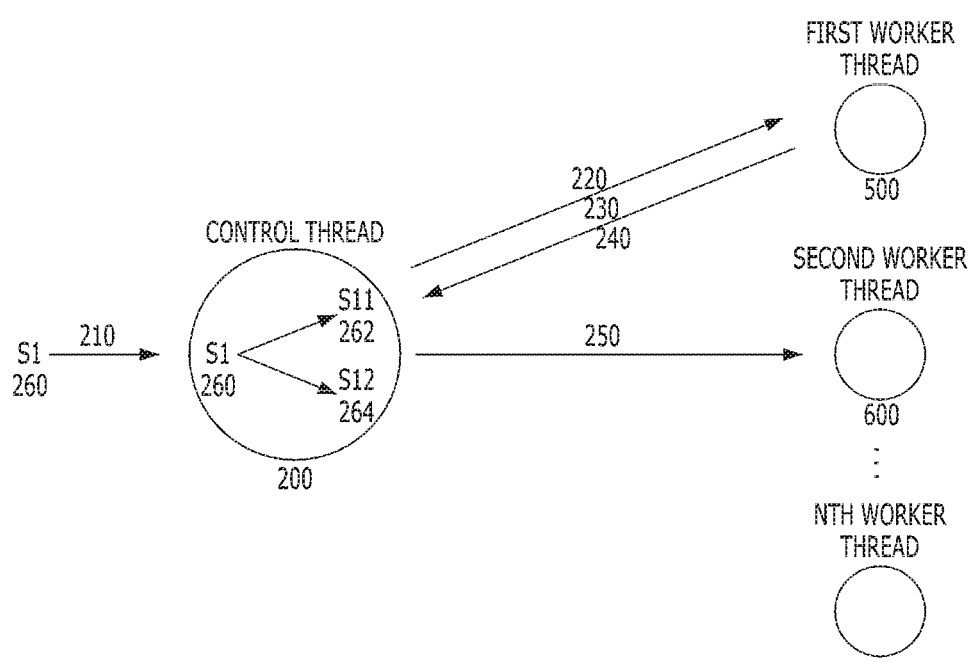
FIG. 2 is a diagram schematically illustrating a synchronous processing method between micro-services according to an exemplary embodiment of the present disclosure.

FIG. 2 is a diagram schematically illustrating a synchronous processing method between micro services according to an exemplary embodiment of the present disclosure.

A control thread 200 of the processor 120 may receive a service 260 (210). The control thread 200 of the processor 120 may allocate the service ID to the received service 260. The service ID may be a form of a number, a coordinate, a character array, or the like, as described above, but this is only an example and the present disclosure is not limited thereto. The service ID may be a format defined by a user.

The control thread 200 of the processor 120 may identify one or more micro-services included in the service 260. The service 260 may be identified as a first micro-service 262 and a second micro-service 264. The micro service may be configured as an intermediate step for performing the service. For example, when the service is the account transfer task for customer B of customer A, the service 260 may be identified as a micro-service 262 for an operation of withdrawing from the account of customer A and a micro-service 264 for an operation of depositing in the account of customer B. The disclosure of the service 260, the first micro-service 262, and the second micro-service 264 is just an example and the present disclosure is not limited thereto. The first micro-service 262 and the second micro-service 264 may have the same service ID as the service ID assigned to the service 260.

The control thread 200 of the processor 120 may allocate the micro-service included in the service 260 to the worker thread. The control thread 200 of the processor 120 may allocate the first micro-service 262 of the plurality of micro-services included in the service 260 to a first worker thread 500. The control thread 200 of the processor 120 may allocate the processing of the micro-service to the non-working worker thread among a plurality of the worker threads. The first worker thread 500 may process the allocated first micro-service 262 and return the result to the control thread 200 (230).

The control thread 200 of the processor 120 may identify the service ID of the processing result received from the first worker thread 500. The control thread 200 of the processor 120 may identify the service 260 including the first micro-service 262 from the identified service ID. The control thread 200 of the processor 120 may allocate a next micro-service 264 included in the identified service 260 to the worker thread. The second micro-service 264 corresponding to the next micro-service may be allocated to the first worker thread 500 when the first worker thread 500 in which the first micro-service 262 is processed is not processing any other work (240). The second micro-service 264 may be allocated to a second worker thread 250 which is different from the first worker thread 500 in which the first micro-service 262 is processed and is not performing the work at present.

When receiving the processing result of the first micro-service 262 from the first worker thread 500 so that the micro services included in the same service 260 may maintain the consistency, the control thread 200 of the processor 120 may allocate the second micro-service 264 which is the next micro-service to an arbitrary worker thread which is not performing work. Through the synchronous processing of the micro-services included in the same service 260, the processing in one service may maintain the consistency.

Figure 3:
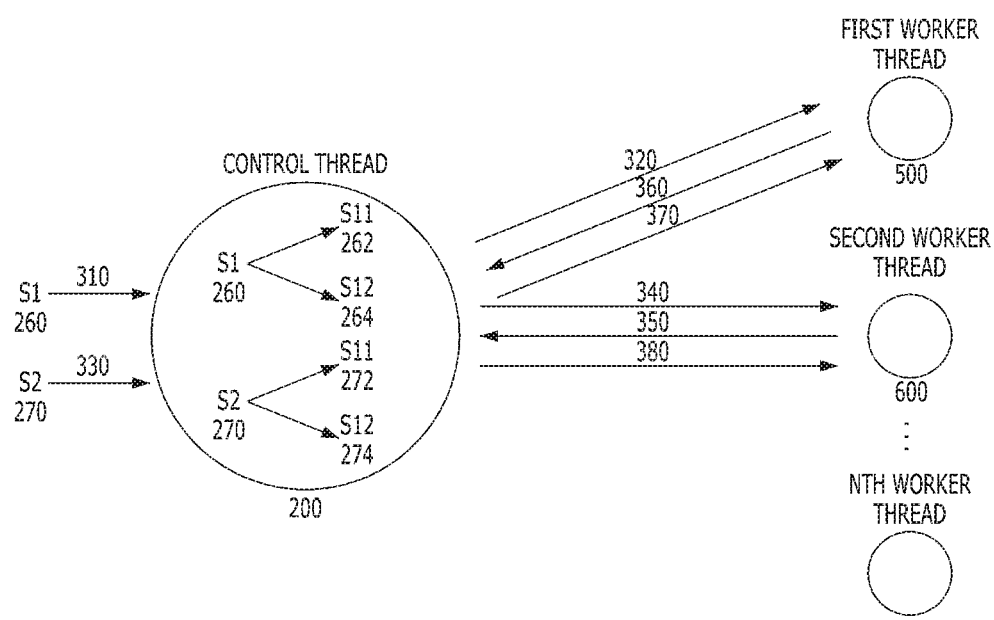
FIG. 3 is a diagram schematically illustrating an asynchronous processing method between services according to an exemplary embodiment of the present disclosure.

FIG. 3 is a diagram schematically illustrating an asynchronous processing method between services according to an exemplary embodiment of the present disclosure.

The control thread 200 of the processor 120 may receive a plurality of services. The processor may receive a first service 260 (310) and then, receive a second service 270 (330). For example, the first service 260 may be an account transfer task for customer A, which the client (that is, a banker terminal, etc.) of the computing device 100, which constitutes the server of a bank, wishes to process using the computing device 100. For example, the second service 270 may be an exchange task for customer A, which the client (that is, a banker terminal, etc.) of the computing device 100, which constitutes the server of a bank, wishes to process using the computing device 100. The disclosure of the service described above is just an example and the present disclosure is not limited thereto.

The control thread 200 of the processor 120 may assign the service IDs to the received first service 260 and second service 270, respectively. The first service ID of the first service 260 and the second service ID of the second service may have unique service IDs, respectively.

The control thread 200 of the processor 120 may identify one or more micro-services included in the first service 260. The micro-service may be configured as an intermediate step for performing the service. As described above, a plurality of micro-services may have the same service ID. For example, when the first service 260 is the account transfer task for customer A, the first micro-service 262 for the first service 260 may be the withdrawal operation from the customer A account and the second micro-service 264 for the first service 260 may be the deposit operation in customer B account. The disclosure of the micro-service described above is just an example and the present disclosure is not limited thereto.

The control thread 200 of the processor 120 may allocate the first micro-service 262 of the micro-services of the first service 260 to the first worker thread 500 (320). The first worker thread 500 may be a worker thread that is not performing work among the plurality of worker threads.

The control thread 200 of the processor 120 may identify one or more micro-services included in the second service 270. The micro-service may be configured as an intermediate step for performing the service. As described above, the plurality of micro-services may have the same service ID. For example, when the second service 270 is the exchange task for customer A, a first micro-service 272 for the second service 270 may be an operation of confirming an exchange preference rate of customer A and the second micro-service 274 for the second service 270 may be an operation of withdrawing an exchange demand amount from the account of customer A. The disclosure of the micro-service described above is just an example and the present disclosure is not limited thereto. The second service 270 may be a service independent of the first service 260.

The control thread 200 of the processor 120 may allocate the first micro-service 272 of the second service 270 to the second worker thread 600 regardless of whether to receive the processing result for the first micro-service of the first service 260 (340). The second worker thread 600 may be a worker thread different from the first worker thread 500 that is processing another micro-service. The second worker thread 600 may be a worker thread that is not performing work among the plurality of worker threads.

The second worker thread 600 of the processor 120 may process the first micro-service 272 of the allocated second service 270 and return the processing result to the control thread 200 of the processor 120 (350). The first worker thread 500 of the processor 120 may process the first micro-service 262 of the allocated first service 260 and return the processing result to the control thread 200 of the processor 120 (360).

The control thread 200 of the processor 120 may identify the service ID of each processing result received from the worker thread. The processing result in which the first service ID is identified may be identified as the processing result of the first micro-service 262 belonging to the first service 260. The control thread 200 of the processor 120 may allocate the second micro-service 264 which is the next micro-service of the first service to an arbitrary worker thread which is not performing work among the plurality of worker threads. The control thread 200 of the processor 120 may allocate the second micro-service 264 which is the next micro-service of the first service to the first worker thread 500 in which the first micro-service 262 of the first service is processed (370). The control thread 200 of the processor 120 may allocate the second micro-service 264 which is the next micro-service of the first service to the second worker thread 600 in which the first micro-service 262 of the second service is processed (380). The control thread 200 of the processor 120 may allocate the second micro-service 264 which is the next micro-service of the first service to another worker thread other than the first worker thread 500 or the second worker thread 600.

The control thread 200 of the processor 120 may process the first service 260 and the second service 270 asynchronously without waiting for completion of processing between the first service 260 and the second service 270 which are different services. The control thread 200 of the processor 120 may process the first service 260 and the second service 270 in parallel. It is possible to eliminate the overhead of waiting for completion of service processing by processing a plurality of services asynchronously. The processing performance of the computing device may be enhanced by eliminating the overhead of waiting for completion of the service processing.

Figure 4:
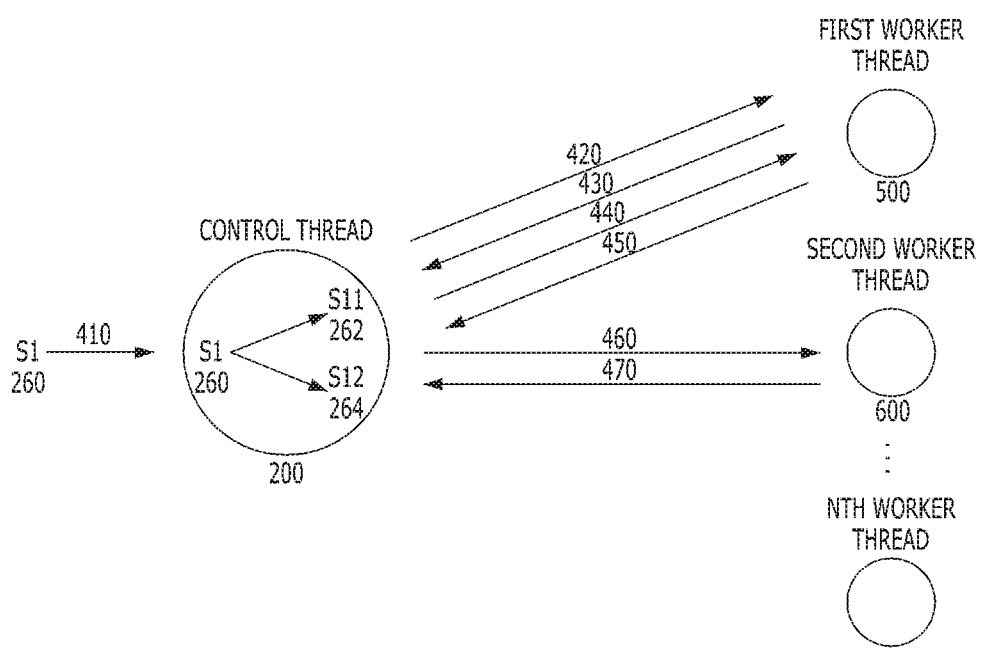
FIG. 4 is a diagram schematically illustrating a processing method of a rollback micro-service according to an exemplary embodiment of the present disclosure.

FIG. 4 is a diagram schematically illustrating a processing method of a rollback micro service according to an exemplary embodiment of the present disclosure.

As illustrated in FIG. 2, the control thread 200 of the processor 120 may assign the service ID by receiving the service 260 (410). The control thread 200 of the processor 120 may be identified as the first micro-service 262 and the second micro-service 264. The control thread 200 of the processor 120 may allocate the first micro-service 262 to the first worker thread 500 that is not processing another work (420). The first worker thread 500 of the processor 120 may process the first micro-service 262 and then return the processing result to the control thread 200 (430). The control thread 200 of the processor 120 may identify the service ID of the processing result. The control thread 200 of the processor 120 may determine the corresponding processing result as the processing result of the first micro-service 262 of the service 260 corresponding to the service ID. The control thread 200 of the processor 120 may allocate the second micro-service 262 which is the next micro-service of the service 260 to the first worker thread 500 that processes the first micro-service 262 (440). The control thread 200 of the processor 120 may allocate the second micro-service 262 which is the next micro-service of the service 260 to a worker thread which is not performing different from the first worker thread 500 that processes the first micro-service 262.

When the processing of the second micro-service 262 is unsuccessful, the first worker thread 500 of the control thread 200 may return the processing failure result to the control thread 200 (450). The control thread 200 of the processor 120 may identify the service DI of the processing result when receiving the processing failure result of the micro-service from the first worker thread 500. The control thread 200 of the processor 120 may identify the service 260 to which the micro-service of which processing is unsuccessful belongs based on the identified service ID. The control thread 200 of the processor 120 may decide to roll back the already executed micro service of the corresponding service 260. The control thread 200 of the processor 120 may roll back the first micro-service. The control thread 200 of the processor 120 may transfer the rollback of the first micro-service to a separate transaction manager (not illustrated). The transaction manager (not illustrated) may roll back the first micro-service transferred from the control thread 200 of the processor 120. The first worker thread 500 of the processor 120 that fails to process the second micro-service 262 may transfer the rollback of the first micro-service to the separate transaction manager (not illustrated). The transaction manager (not illustrated) may roll back the first micro-service transferred from the first worker thread 500 of the processor 120. For example, if the service 260 is the account transfer task for customer B of customer A, only when both the first micro-service 262, which is an operation of withdrawing money from the account of customer A and the second micro-service 264, which is an operation of depositing money in the account of customer B are processed, it may be determined that the corresponding service 260 is completed. When the second micro-service 264 is unsuccessful in processing, which is the operation of depositing money into the account of customer B for reasons such as stopping the account of customer B after completing the processing of the first micro-service 262, which is the operation of withdrawing money from the account of customer A, the control thread 200 may decide to roll back the first micro-service 262 which is the operation withdrawing money from the account of customer A. The control thread 200 of the processor 120 may perform the rollback to roll back the processing result of the first micro-service 262 which is the operation of withdrawing money from the account of customer A to the processing result before the execution. The control thread 200 of the processor 120 may transfer to the separate transaction manager (not illustrated) the rollback to roll back the processing result of the first micro-service 262 which is the operation of withdrawing money from the account of customer A to the processing result before the execution. The first worker thread 500 of the processor 120 may transfer to the separate transaction manager (not illustrated) the rollback to roll back the processing result of the first micro-service 262 which is the operation of withdrawing money from the account of customer A to the processing result before the execution. The transaction manager (not illustrated) may perform the rollback to roll back the processing result of the first micro-service 262 which is the operation of withdrawing money from the account of customer A to the processing result before the execution. The disclosure of the service and the micro-service described above is just an example and the present disclosure is not limited thereto.

When the processing of one micro-service is unsuccessful, work of writing the result of the processing failure to the database may be performed separately from a rollback service. The work of writing the result of the processing failure to the database may be performed in units of multiple micro-services by the worker thread. The work of writing the result of the processing failure to the database may be performed in units of one micro-service. Contents of the processing failure to be written to the database may be the failure result of one or more micro-services. The contents of the processing failure to be written to the database may be the result of the failure of all micro-services belonging to one service.

The control thread 200 of the processor 120 may perform the rollback of the micro-service and create a micro-service that writes the result of the processing failure of the micro-service to the database. The control thread 200 of the processor 120 may assign a different service ID from the micro-service which is unsuccessful to the micro-service that writes the result of the processing failure of the micro-service to the database. The control thread 200 of the processor 120 may allocate the micro-service that writes the result of the processing failure of the micro-service to the database to the worker thread which is not performing work among the plurality of worker threads (460). The second worker thread 600 of the processor 120 may process the micro-service that writes the result of the processing failure of the micro-service to the database and thereafter, return an execution result to the control thread 200 of the processor 120 (470).

When all of the plurality of micro-services belonging to one service may not be completely processed and processing of even one micro-service is unsuccessful in the middle, the rollback is performed in which the processing results of all the micro-services that have already been performed are rolled back to the processing results before the execution, so that the consistency may be maintained even if the processing of the service is unsuccessful in the middle.

Figure 5:
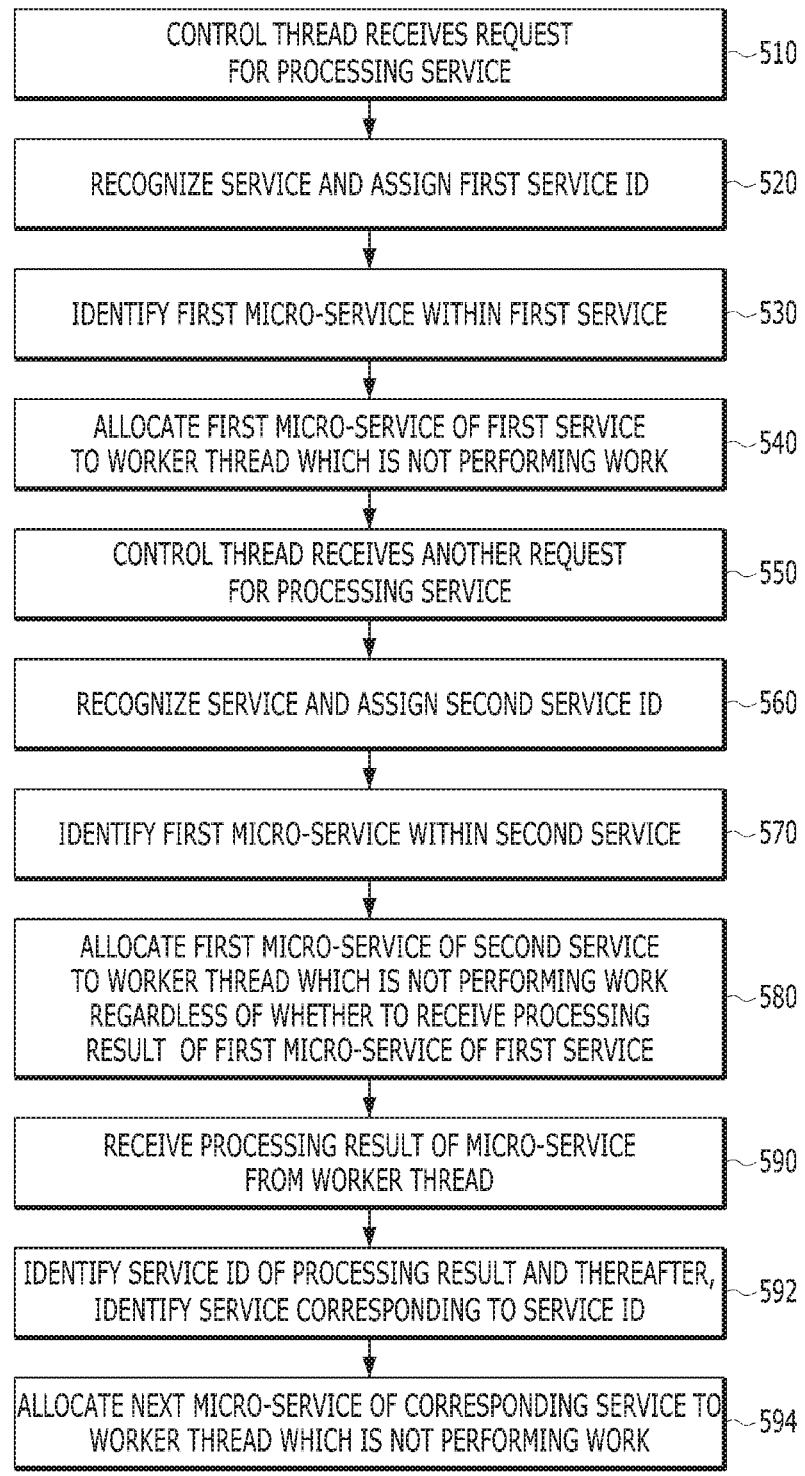
FIG. 5 is a flowchart for service processing according to an exemplary embodiment of the present disclosure.

FIG. 5 is a flowchart for service processing according to an exemplary embodiment of the present disclosure.

As a computing device 100 for processing a service, the computing device 100 receives a service request for service processing (510). The control thread of the computing device 100 recognizes the service and assigns the first service ID (520). The control thread of the computing device 100 identifies the first micro-service in the first service (530). The control thread of the computing device 100 allocates the first micro-service of the first service to a worker thread that is not performing work (540). The computing device 100 receives another request for the service processing (550). The control thread of the computing device 100 recognizes the service and assigns the second service ID (560). The control thread of the computing device 100 identifies the first micro-service in the second service (570). The control thread of the computing device 100 allocates the first micro-service of the second service to the worker thread that is not performing work regardless of whether to receive the processing result of the first micro-service of the first service (580). The control thread of the computing device 100 receives the processing result of the micro-service from the worker thread (590). The control thread of the computing device 100 identifies the service ID of the processing result of the micro-service and thereafter, identifies the service corresponding to the service ID (592). The control thread of the computing device 100 allocates the next micro-service of the corresponding service to the worker thread that is not performing work (594). The control thread of the processor processes the service asynchronously without waiting for mutual processing completion with respect to the micro-services included in different services to eliminate overhead of waiting for the processing completion of the service, thereby enhancing the processing performance of the computing device.

Figure 6:
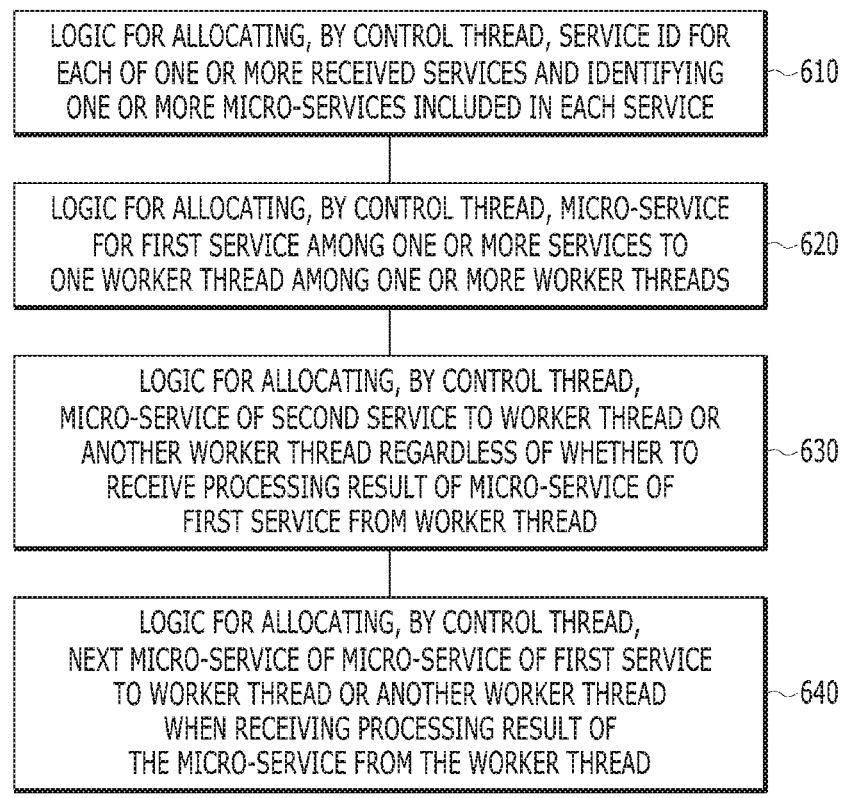
FIG. 6 is a block diagram illustrating logic for implementing a method of processing a service according to an exemplary embodiment of the present disclosure.

FIG. 6 is a block diagram illustrating logic for implementing a method of processing a service according to an exemplary embodiment of the present disclosure.

The method for controlling a database service for processing a service according to an exemplary embodiment of the present disclosure may be implemented by the following logic.

The method for controlling a database service for processing a service according to an exemplary embodiment of the present disclosure may include: logic 610 for allocating, by a control thread, a service ID for each of one or more received services and identifying one or more micro-services included in each service; logic 620 for allocating, by the control thread, a micro-service for a first service among the one or more services to one worker thread among one or more worker threads; logic 630 for allocating, by the control thread, the micro-service of a second service to the worker thread or another worker thread regardless of whether to receive a processing result of the micro-service of the first service from the worker thread; and logic 640 for allocating, by the control thread, a next micro-service of the micro-service of the first service to the worker thread or another worker thread when receiving the processing result of the micro-service from the worker thread.

Figure 7:
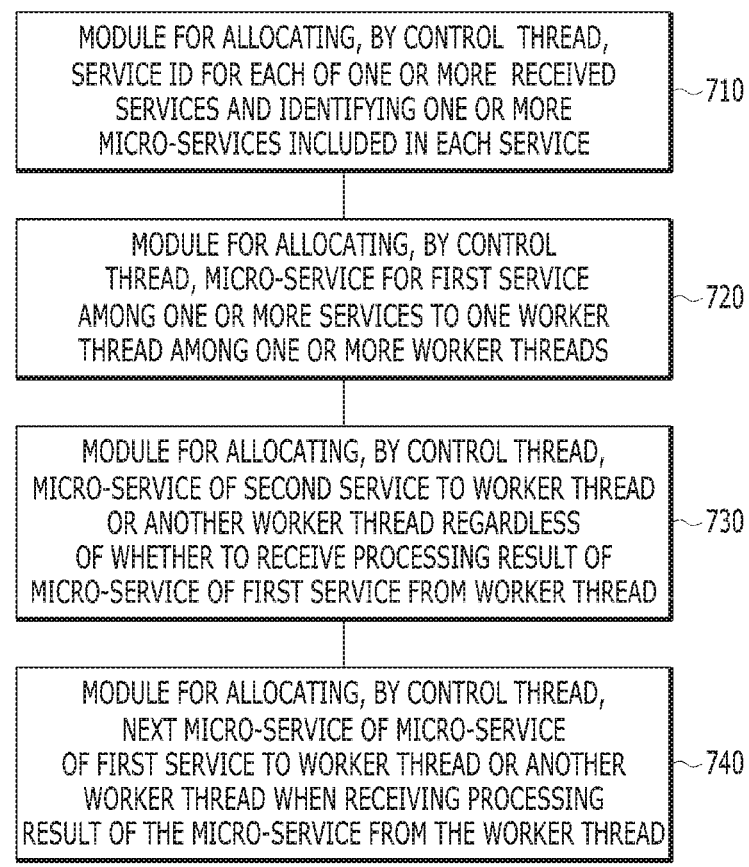
FIG. 7 is a block diagram illustrating a module for implementing a method of processing a service according to an exemplary embodiment of the present disclosure.

FIG. 7 is a block diagram illustrating a module for implementing a method of processing a service according to an exemplary embodiment of the present disclosure.

The method for controlling a database service for processing a service according to an exemplary embodiment of the present disclosure may be implemented by the following modules.

The method for controlling a database service for processing a service according to an exemplary embodiment of the present disclosure may include: a module 710 for allocating, by a control thread, a service ID for each of one or more received services and identifying one or more micro-services included in each service; a module 720 for allocating, by the control thread, a micro-service for a first service among the one or more services to one worker thread among one or more worker threads; a module 730 for allocating, by the control thread, the micro-service of a second service to the worker thread or another worker thread regardless of whether to receive a processing result of the micro-service of the first service from the worker thread; and a module 740 for allocating, by the control thread, a next micro-service of the micro-service of the first service to the worker thread or another worker thread when receiving the processing result of the micro-service from the worker thread.

Figure 8:
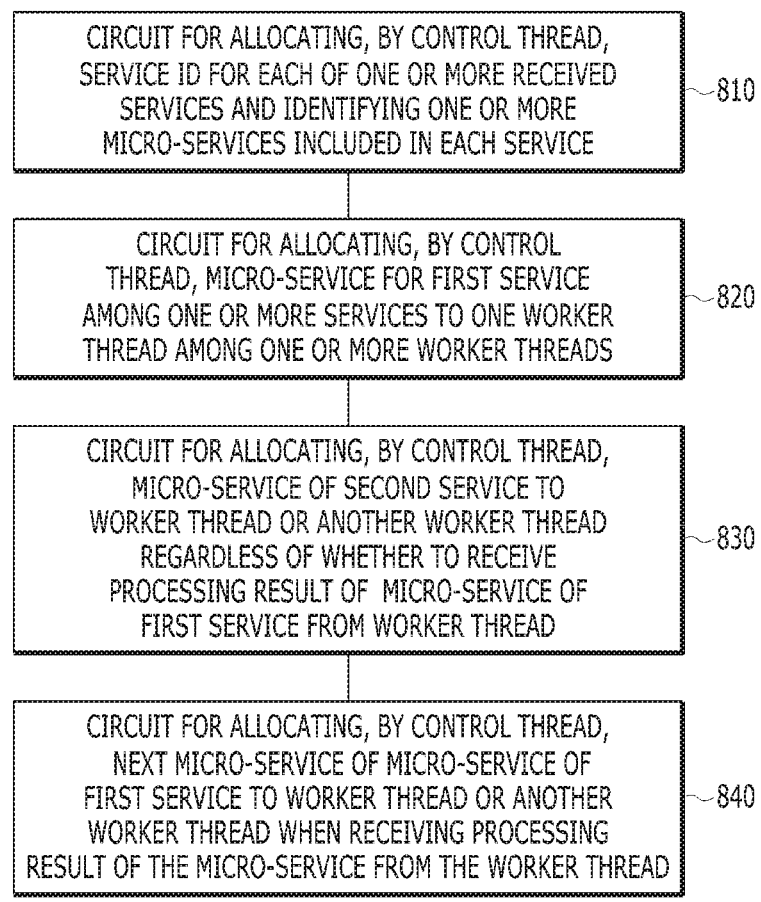
FIG. 8 is a block diagram illustrating a circuit for implementing a method of processing a service according to an exemplary embodiment of the present disclosure.

FIG. 8 is a block diagram illustrating a circuit for implementing a method of processing a service according to an exemplary embodiment of the present disclosure.

The method for controlling a database service for processing a service according to an exemplary embodiment of the present disclosure may be implemented by the following circuits.

The method for controlling a database service for processing a service according to an exemplary embodiment of the present disclosure may include: a circuit 810 for allocating, by a control thread, a service ID for each of one or more received services and identifying one or more micro-services included in each service; a circuit 820 for allocating, by the control thread, a micro-service for a first service among the one or more services to one worker thread among one or more worker threads; a circuit 830 for allocating, by the control thread, the micro-service of a second service to the worker thread or another worker thread regardless of whether to receive a processing result of the micro-service of the first service from the worker thread; and a circuit 840 for allocating, by the control thread, a next micro-service of the micro-service of the first service to the worker thread or another worker thread when receiving the processing result of the micro-service from the worker thread.

Figure 9:
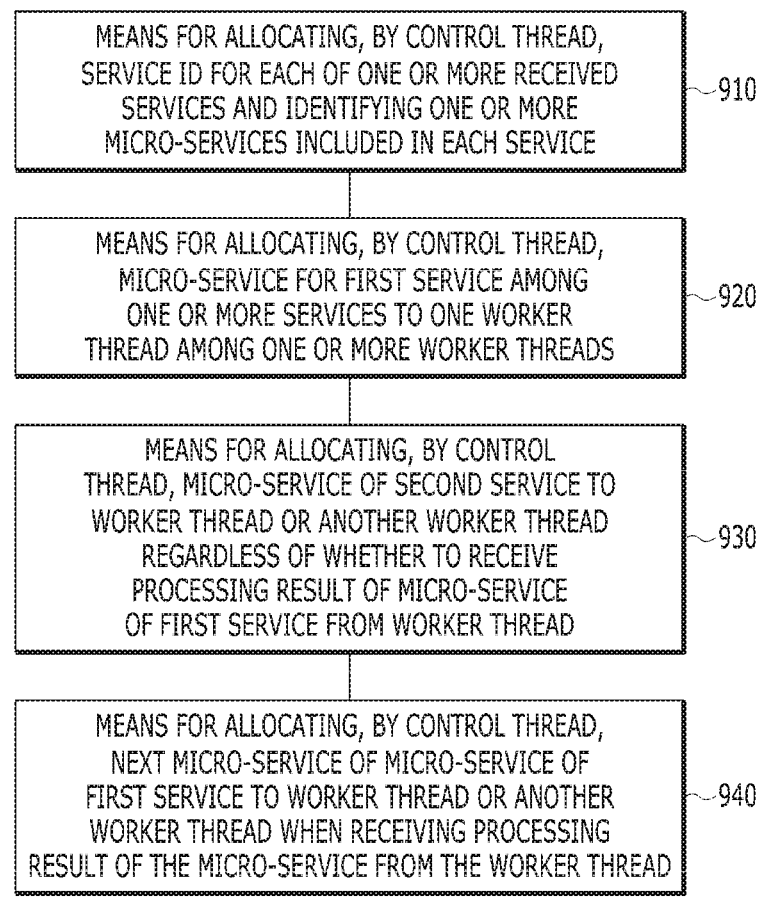
FIG. 9 is a block diagram illustrating a means for implementing a method of processing a service according to an exemplary embodiment of the present disclosure.

FIG. 9 is a block diagram illustrating a means for implementing a method of processing a service according to an exemplary embodiment of the present disclosure.

The method for controlling a database service for processing a service according to an exemplary embodiment of the present disclosure may be implemented by the following means.

The method for controlling a database service for processing a service according to an exemplary embodiment of the present disclosure may include: a means 910 for allocating, by a control thread, a service ID for each of one or more received services and identifying one or more micro-services included in each service; a means 920 for allocating, by the control thread, a micro-service for a first service among the one or more services to one worker thread among one or more worker threads; a means 930 for allocating, by the control thread, the micro-service of a second service to the worker thread or another worker thread regardless of whether to receive a processing result of the micro-service of the first service from the worker thread; and a means 940 for allocating, by the control thread, a next micro-service of the micro-service of the first service to the worker thread or another worker thread when receiving the processing result of the micro-service from the worker thread.

Figure 10:
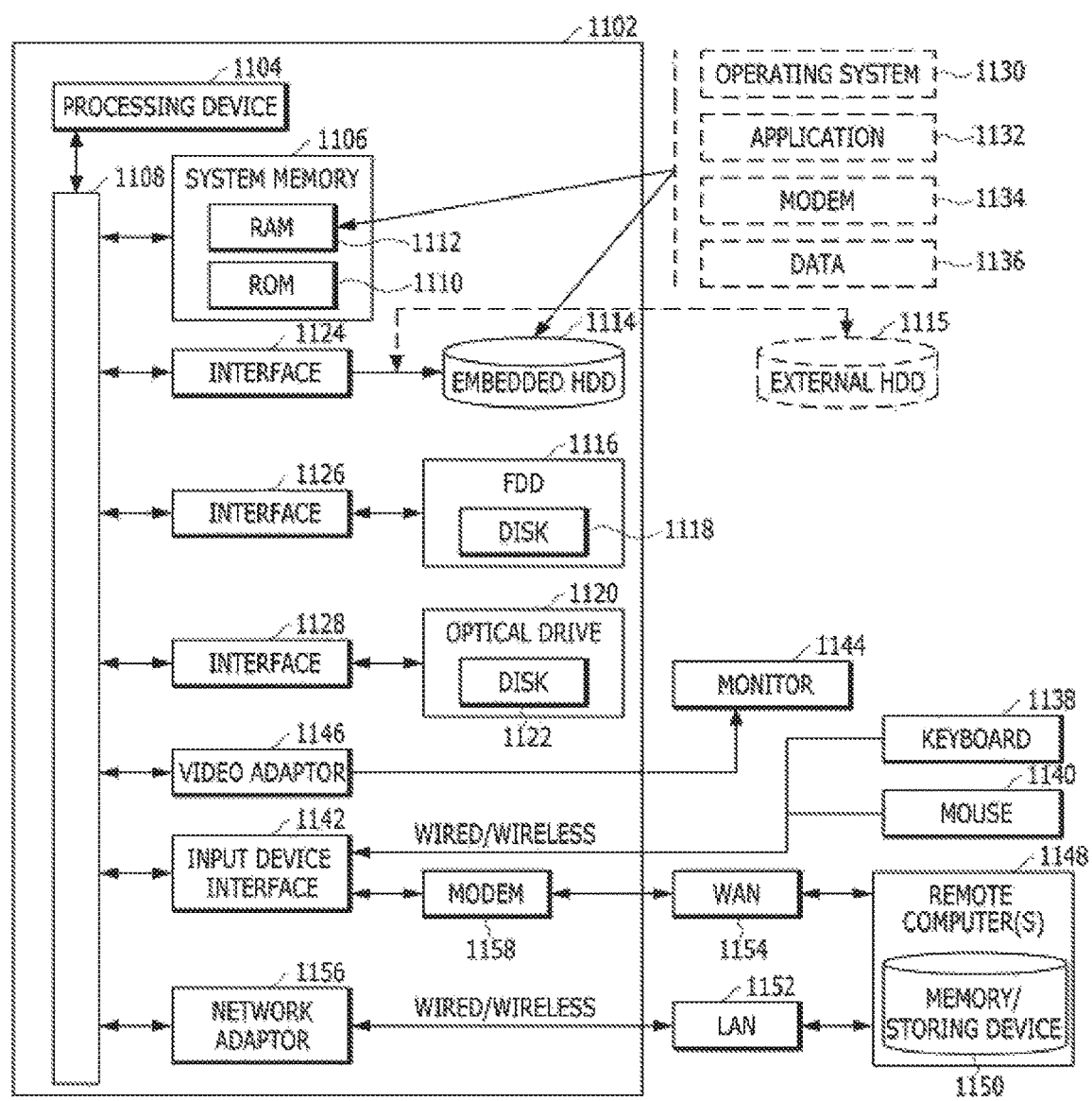
FIG. 10 is a block diagram of a computing device according to an exemplary embodiment of the present disclosure.

FIG. 10 is a block diagram of a computing device according to an exemplary embodiment of the present disclosure.

FIG. 10 illustrates a simple and general schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof. The computer readable media include volatile and non-volatile media, transitory and non-transitory media, and mobile and non-mobile media. As not a limit but an example, the computer readable media may include both computer readable storage media and computer readable transmission media. The computer readable storage media include volatile and non-volatile media, temporary or non-temporary media, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA)—the internal hard disk drive (HDD) 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computer device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11.6b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the embodiments presented herein, but should be analyzed within the widest range which is consistent with the principles and new features presented herein.

What is claimed is:

1. A computer program stored in a non-transitory computer-readable storage medium, wherein the computer program executes the following operations for processing a service when the computer program is executed by one or more processors of a computing device, the operations comprising:

an operation of allocating, by a control thread, a service ID for each of one or more received services and identifying one or more micro-services, which is configured as an intermediate step for performing a service, included in each service, allocating a same service ID to one or more micro-services included in a same service;

an operation of allocating, by the control thread, a micro-service, which corresponds to a first service ID, included in a first service among the one or more services to one worker thread among one or more worker threads, which are included in a same system as the control thread, and each of which is to process the allocated micro-service and to return a processing result to the control thread;

an operation of allocating, by the control thread, the micro-service, which corresponds to a second service ID, included in a second service to the one worker thread or another worker thread, but which is not processing any micro-services, regardless of whether to receive a processing result of the micro-service included in the first service from the one worker thread;

an operation of allocating, by the control thread, a next micro-service of the micro-service, which corresponds to the first service ID and which is to be processed after the micro-service for synchronous processing, included in the first service to the one worker thread or another worker thread, which is not processing, when receiving the processing completion result of the micro-service, which corresponds to the first service ID and which is included in the first service, from the worker thread, regardless of whether to receive a processing result of the micro-service included in the second service; and an operation of deciding, by the control thread to roll back, which is to return the processing completion result of already processed micro-service to before processing, the micro-service included in the first service, which is already executed before the next micro-service, when receiving a processing failure result of the next micro-service included in the first service from the worker thread.

2. The computer program stored in a non-transitory computer-readable storage medium of claim 1, wherein the operation of allocating a service ID for each of one or more services receiving a control thread and identifying one or more micro-services, which is configured as an intermediate step for performing a service, included in each service, allocating a same service ID to one or more micro-services included in a same service includes an operation of assigning, by the control thread, a first service ID for identifying a service to the first service, and an operation of assigning, by the control thread, a second service ID different from the first service ID to the second service different from the first service.

3. The computer program stored in a non-transitory computer-readable storage medium of claim 1, wherein the operation of allocating, by the control thread, a micro-service, which corresponds to a first service ID, included in a first service among the one or more services to one worker thread among one or more worker threads, which are included in a same system as the control thread, and each of which is to process an allocated micro-service and to return a processing result to the control thread includes an operation of allocating, by the control thread, a first micro-service among one or more micro-services of the first service to the worker thread.

4. The computer program stored in a non-transitory computer-readable storage medium of claim 1, wherein the service ID for identifying the service is assigned to the micro-service.

5. The computer program stored in a non-transitory computer-readable storage medium of claim 1, wherein the operation of deciding, by the control thread to roll back, which is to return the processing completion result of already processed micro-service to before processing, the micro-service included in the first service, which is already executed before the next micro-service, when receiving a processing failure result of the next micro-service included in the first service from the worker thread includes an operation of identifying, by the control thread, the first service to be rolled back based on the first service ID of the processing failure result of the received micro-service, and an operation of performing, by the control thread, a rollback to roll back a processing result of the executed micro-service of the first service to the processing result before execution.

6. A computing device for processing a service, comprising:

a processor including one or more cores; and a memory,
wherein the processor allows
a control thread to allocate a service ID for each of one or more received services and identify one or more micro-services, which is configured as an intermediate step for performing a service, included in each service, allocate a same service ID to one or more micro-services included in a same service,
the control thread to allocate a micro-service, which corresponds to a first service ID, included in a first service among the one or more services to one worker thread among one or more worker threads, which are included in a same system as the control thread, and each of which is to process the allocated micro-service and to return a processing result to the control thread,
the control thread to allocate the micro-service, which corresponds to a second service ID, included in a second service to the one worker thread or another worker thread, but which is not processing any micro-services, regardless of whether to receive a processing result of the micro-service included in the first service from the one worker thread, and
the control thread to allocate a next micro-service of the micro-service, which corresponds to the first service ID and which is to be processed after the micro-service for synchronous processing, included in the first service to the one worker thread or another worker thread, which is not processing, when receiving the processing completion result of the micro-service, which corresponds to the first service ID and which is included in the first service, from the worker thread, regardless of whether to receive a processing result of the micro-service included in the second service;
the control thread to decide to roll back, which is to return the processing completion result of already processed micro-service to before processing, the micro-service included in the first service, which is already executed before the next micro-service, when receiving a processing failure result of the next micro-service included in the first service from the worker thread.

7. A method for processing a service, comprising:
allocating, by a control thread, a service ID for each of one or more received services and identifying one or more micro-services, which is configured as an intermediate step for performing a service, included in each service, allocating a same service ID to one or more micro-services included in a same service;
allocating, by the control thread, a micro-service, which corresponds to a first service ID, included in a first service among the one or more services to one worker thread among one or more worker threads, which are included in a same system as the control thread, and each of which is to process the allocated micro-service and to return a processing result to the control thread;
allocating, by the control thread, the micro-service, which corresponds to a second service ID, included in a second service to the one worker thread or another worker thread, but which is not processing any micro-services, regardless of whether to receive a processing result of the micro-service included in the first service from the one worker thread; and
allocating, by the control thread, a next micro-service of the micro-service, which corresponds to the first service ID and which is to be processed after the micro-service for synchronous processing, included in the first service to the one worker thread or another worker thread, which is not processing, when receiving the processing completion result of the micro-service, which corresponds to the first service ID and which is included in the first service, from the worker thread, regardless of whether to receive a processing result of the micro-service included in the second service;
deciding, by the control thread to roll back, which is to return the processing completion result of already processed micro-service to before processing, the micro-service included in the first service, which is already executed before the next micro-service, when receiving a processing failure result of the next micro-service included in the first service from the worker thread.

* * * * *